(12) United States Patent
Hammond et al.

(10) Patent No.: US 7,028,463 B2
(45) Date of Patent: Apr. 18, 2006

(54) ENGINE VALVE ASSEMBLY

(75) Inventors: Bryant G. Hammond, West Bloomfield, MI (US); David A. Frank, Rochester Hills, MI (US); Martin L. Hall, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/940,523

(22) Filed: Sep. 14, 2004

(65) Prior Publication Data
US 2006/0053770 A1    Mar. 16, 2006

(51) Int. Cl.
*F02M 25/07*    (2006.01)
*F01N 3/10*    (2006.01)

(52) U.S. Cl. .................. 60/278; 60/304; 123/568.11
(58) Field of Classification Search .......... 123/568.11, 123/568.12, 568.15, 568.17–568.21, 568.23–568.28; 60/28–292, 304, 306, 307
See application file for complete search history.

(56) References Cited

U.S. PATENT DOCUMENTS

| | | | |
|---|---|---|---|
| 3,911,674 A * | 10/1975 | Goto et al. .................. | 60/278 |
| 4,177,641 A * | 12/1979 | Wakita et al. ............... | 60/278 |
| 4,316,438 A * | 2/1982 | Iizuka .................... | 123/198 F |
| 6,167,699 B1 | 1/2001 | Johnston et al. ............. | 60/304 |
| 2001/0032458 A1* | 10/2001 | Suzuki et al. ............... | 60/288 |
| 2004/0237509 A1* | 12/2004 | Bhargava et al. ............. | 60/278 |

* cited by examiner

*Primary Examiner*—Willis R. Wolfe, Jr.
(74) *Attorney, Agent, or Firm*—Christopher DeVries

(57) ABSTRACT

A valve assembly defines a chamber and three ports. A first valve selectively obstructs a first port to prevent fluid communication between a secondary air injection pump and the chamber. A second valve selectively obstructs a second port to prevent fluid communication between an air intake manifold and the chamber. A third port provides fluid communication between the chamber and an exhaust manifold. The chamber thus serves as a common passageway for secondary air flowing from the pump to the exhaust manifold and for exhaust gas flowing from the exhaust manifold to the air intake manifold. In a preferred embodiment, the first and second valves are rigidly interconnected.

8 Claims, 3 Drawing Sheets

ENGINE VALVE ASSEMBLY

TECHNICAL FIELD

This invention relates to valve assemblies that define a chamber with three ports and two valves for selectively providing fluid communication between a secondary air injection pump, an exhaust manifold, and an intake manifold.

BACKGROUND OF THE INVENTION

Vehicles typically include an exhaust gas recirculation (EGR) system to selectively direct internal combustion engine exhaust gas to an air inlet of the engine. EGR can lower the level of certain undesirable engine emission components such as nitrogen oxide (NOx) and can improve fuel economy. Up to a limit, NOx emissions decrease with increasing EGR levels. Beyond the limit, EGR can increase formation of other undesirable engine emission components and can reduce vehicle drivability.

EGR typically involves recirculation of exhaust gas through an EGR passage between an engine exhaust conduit and an engine fresh air intake passage. A valve within the EGR passage (the EGR valve) is controlled to vary a restriction within the EGR passage to regulate the flow of exhaust gas therethrough. When EGR is not required, the EGR valve is driven to a full restriction (closed) position, typically through a spring preload. The spring preload is commonly required to be substantial to ensure rapid closing of the EGR valve when necessary, and to ensure proper sealing of a closed EGR valve. When EGR is required, the EGR valve is driven to an open position through application of a position control signal to an actuator mechanically linked to the EGR valve. The degree of opening of the EGR valve varies with the magnitude of the position control signal. When the EGR valve is open, recirculated exhaust gas enters the fresh air intake passage and flows to the engine cylinders.

Some vehicles also include a secondary air injection (SAI) system. It is known practice to run the engine in a fuel rich condition at start up to (a) aid in the operation of the cold engine and (b) provide fuel for reaction in the exhaust path downstream of the engine to quickly heat up the vehicle's catalytic converter. The SAI system includes an air pump to pump atmospheric air through an SAI passage and into the exhaust path downstream of the engine to react with fuel in the fuel rich exhaust during the time period immediately following vehicle start up. The reaction of the fuel rich exhaust and the pumped-in air, referred to as secondary or supplemental air, is exothermic and serves to heat up the catalytic converter. A valve is configured to selectively provide fluid communication between the air pump and the exhaust path.

SUMMARY OF THE INVENTION

An engine includes an air intake manifold for conveying air to engine cylinders, an exhaust manifold configured to convey exhaust gas from the engine cylinders, and an air pump configured to pressurize air. The engine also includes a valve assembly having a member defining a chamber with a first port, a second port and a third port.

A first valve is selectively movable between a closed position in which the first valve obstructs the first port to prevent fluid communication between the chamber and the air pump, and an open position in which the chamber is in fluid communication with the air pump through the first port. A second valve is selectively movable between a closed position in which the second valve obstructs the second port to prevent fluid communication between the chamber and the air intake manifold, and an open position in which the chamber is in fluid communication with the air intake manifold. The third port is in fluid communication with the exhaust manifold.

The valve assembly thus enables a reduction in the quantity of parts employed by the prior art because an EGR system and an SAI system have a common valve assembly, rather than two separate valve assemblies as found in the prior art. Further, the valve assembly enables a single conduit to interconnect the valve assembly and the exhaust manifold for conveying exhaust gas from the exhaust manifold to the valve assembly, and for conveying secondary air from the valve assembly to the exhaust manifold. The single conduit thus provides both an SAI passage and an EGR passage, thereby eliminating the separate SAI and EGR passages of the prior art. In a preferred embodiment, the first valve and the second valve are rigidly interconnected for unitary movement, and employ a single actuator to selectively move the valves between respective open and closed positions, further reducing the quantity of parts compared to the prior art. The reduction in the quantity of parts enabled by the valve assembly simplifies engine assembly, and reduces cost and mass, compared to the prior art.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
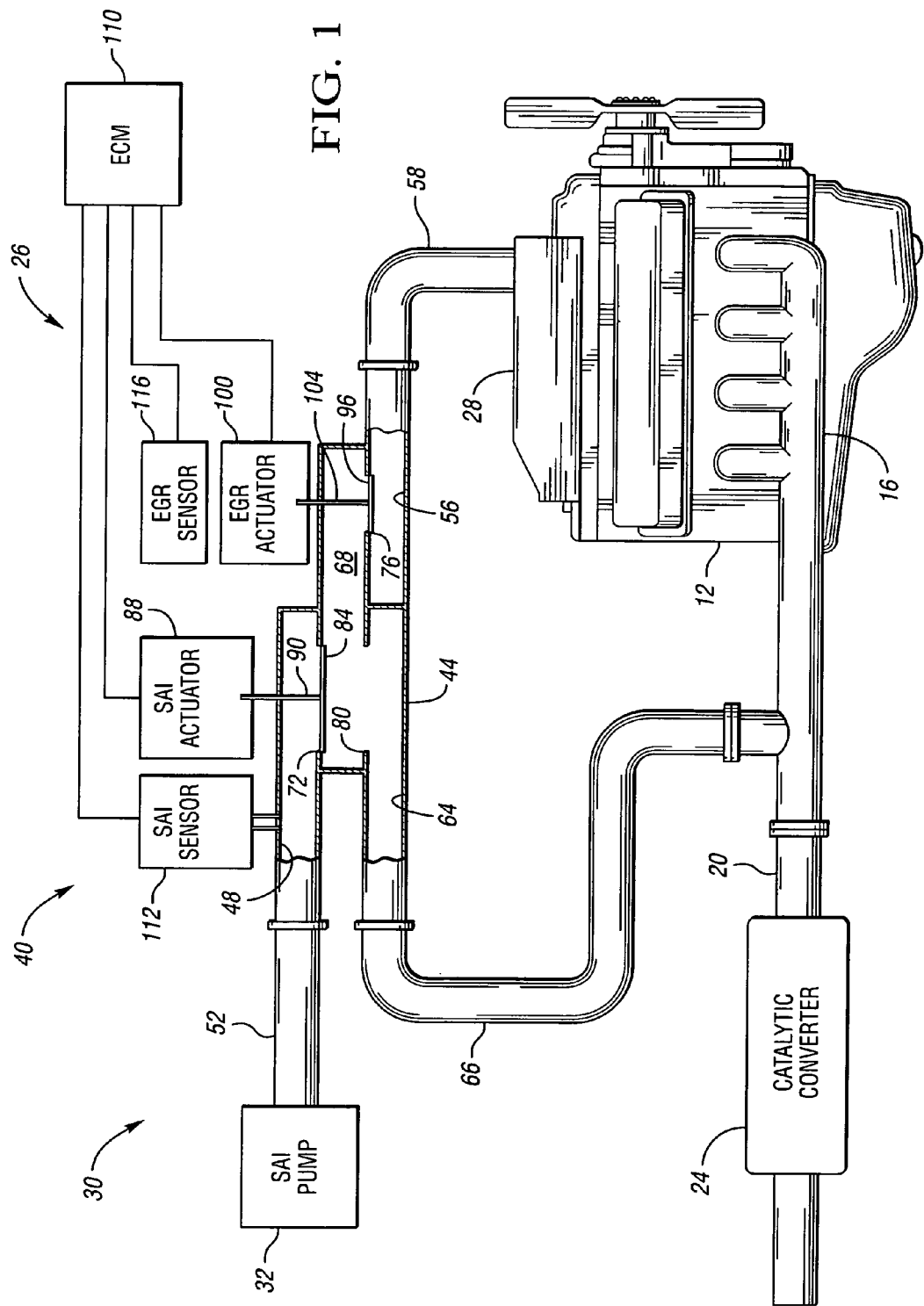
FIG. 1 is a schematic, elevational view, partly in cross section, of an engine including an EGR system and an SAI system having a common valve assembly.

Referring to FIG. 1, an internal combustion engine 12 for a vehicle is schematically depicted. An exhaust manifold 16 is in fluid communication with engine cylinder exhaust ports (not shown) for conveying engine exhaust gas via exhaust pipe 20 to a catalytic converter 24. The engine 12 includes an exhaust gas recirculation (EGR) system 26 that is configured to selectively divert exhaust gas from the exhaust manifold 16 to an intake manifold 28 where it is distributed among the engine cylinders. The engine 12 also includes a secondary air injection (SAI) system 30 that includes a pump 32 configured to pressurize atmospheric air and selectively inject the pressurized air into the exhaust manifold 16.

A valve assembly 40 regulates the flow of secondary air from the pump 32 to the exhaust manifold 16, and the flow of recirculated exhaust gas from the exhaust manifold 16 to the intake manifold 28. The valve assembly 40 includes a member 44 that defines three conduits. A first conduit 48 is coupled to pipe 52, which provides fluid communication between the first conduit 48 and the pump 32. A second conduit 56 is coupled to pipe 58, which provides fluid communication between the second conduit 56 and the air intake manifold 28. A third conduit 64 is coupled to pipe 66, which provides fluid communication between the third conduit 64 and the exhaust manifold 16. Member 44 may be one or more pieces within the scope of the claimed invention.

Figure 2:
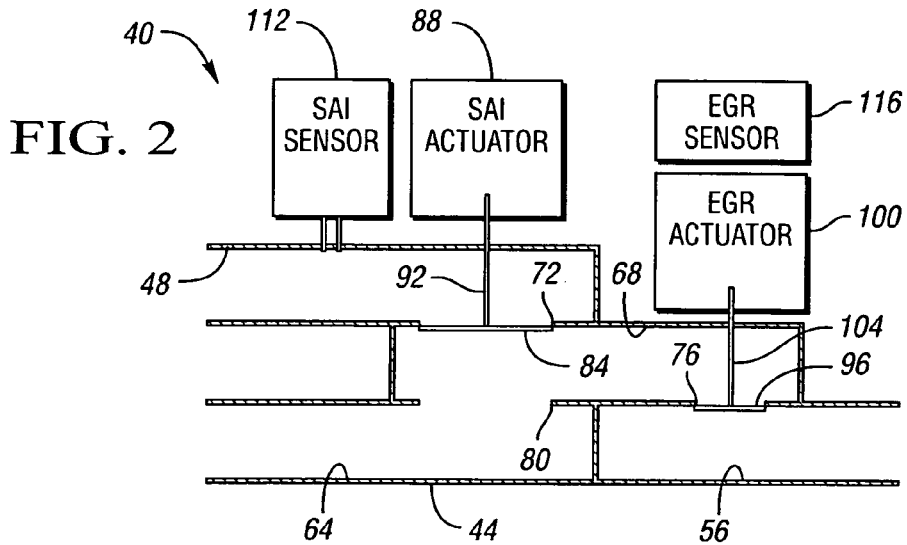
FIG. 2 is a schematic, cross-sectional side view of the valve assembly of FIG. 1 wherein a first valve and a second valve are closed to prevent EGR and secondary air flow.

Referring to FIG. 2, wherein like reference numbers refer to like components from FIG. 1, the member 44 defines a chamber 68, a first port 72, a second port 76, and a third port 80. The first port 72 interconnects the chamber 68 and the first conduit 48. The second port 76 interconnects the chamber 68 and the second conduit 56. The third port 80 interconnects the chamber 68 and the third conduit 64 so that the chamber 68 is in fluid communication with the exhaust manifold.

An SAI valve 84 is connected to an SAI actuator, such as a solenoid 88, via valve stem 92. An EGR valve 96 is connected to an EGR actuator, such as solenoid 100, via valve stem 104. The SAI valve 84 is shown in a closed position in which the SAI valve 84 obstructs port 72 to prevent fluid communication between the chamber 68 and the first conduit 48, and, correspondingly, between the chamber 68 and the air pump, shown at 32 in FIG. 1. Similarly, the EGR valve 96 is shown in a closed position in which the EGR valve 96 obstructs port 76 to prevent fluid communication between the chamber 68 and the second conduit 56, and, accordingly, between the chamber 68 and the intake manifold, shown at 28 in FIG. 1.

Figure 3:
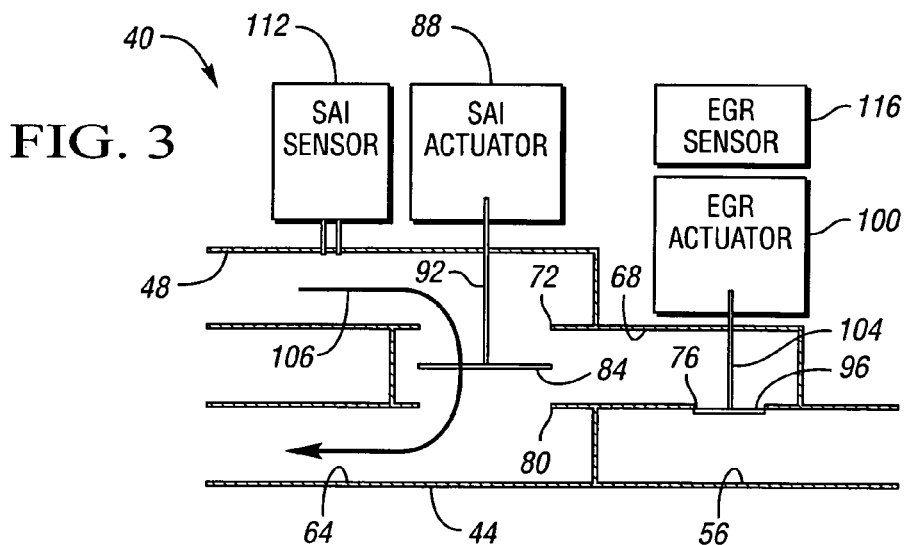
FIG. 3 is a schematic, cross-sectional side view of the valve assembly of FIG. 1 wherein the first valve is open to enable secondary air flow, and the second valve is closed to prevent EGR flow.

Referring to FIG. 3, wherein like reference numbers refer to like components from FIGS. 1 and 2, the valve assembly 40 is depicted in a secondary air injection mode in which pressurized air 106 from the air pump is injected into the exhaust manifold. More specifically, solenoid 88 is configured to selectively move valve stem 92 so that the SAI valve 84 moves to an open position, as depicted in FIG. 3. When the SAI valve 84 is in its open position, the chamber 68 is in fluid communication with the first conduit 48, enabling pressurized air 106 to flow from the air pump to the exhaust manifold via the first conduit 48, port 72, chamber 68, port 80, the third conduit 64 and the pipe shown at 66 in FIG. 1. The EGR valve 96 is in its closed position in the SAI mode.

Figure 4:
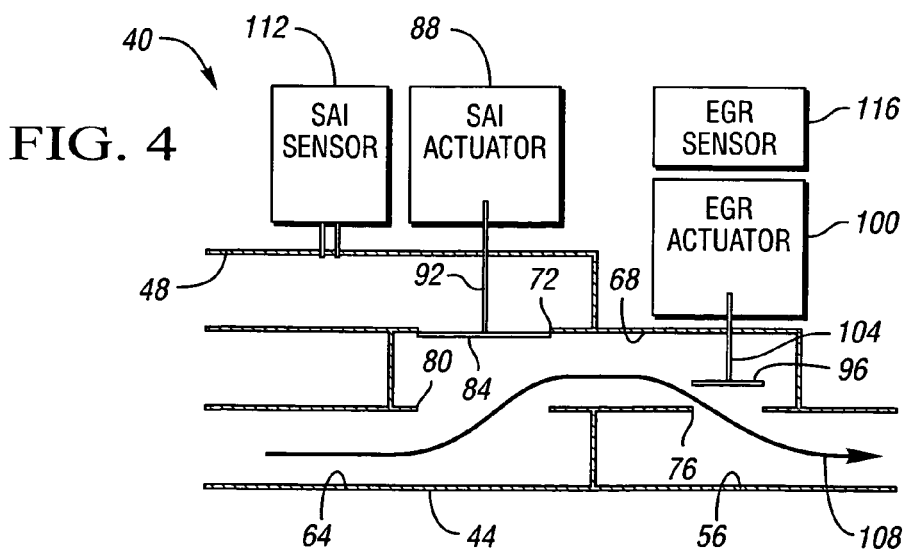
FIG. 4 is a schematic, cross-sectional side view of the valve assembly of FIG. 1, wherein the first valve is closed to prevent secondary air flow, and the second valve is open to enable EGR flow.

Referring to FIG. 4, wherein like reference numbers refer to like components from FIGS. 1–3, the valve assembly 40 is depicted in an EGR mode in which exhaust gas 108 from the exhaust manifold is directed to the air intake manifold. More specifically, solenoid 100 is configured to selectively move valve stem 104 so that the EGR valve 96 moves to an open position, as depicted in FIG. 4. When the EGR valve 96 is in its open position, the chamber 68 is in fluid communication with the second conduit 56, enabling exhaust gas 108 to flow from the exhaust manifold to the intake manifold via the pipe shown at 66 in FIG. 1, the third conduit 64, port 80, chamber 68, port 76, and the second conduit 56. The SAI valve 84 is in its closed position in the EGR mode.

The actuators 88, 100 may include springs that bias the respective valves 84, 96 in the open or closed position.

Referring again to FIG. 1, an electronic control module (ECM) 110 is operatively connected to solenoid 88 and solenoid 100 to cause the solenoids 88, 100 to operate as described herein. The valve assembly 40 further includes an SAI pressure sensor 112 that monitors pressure in the first conduit 48. The SAI pressure sensor 112 is configured to provide signals indicative of the pressure in the first conduit for use by the ECM 110 for diagnostic purposes, as will be understood by those skilled in the art. The valve assembly 40 also includes an EGR sensor 116 that monitors the position of the spindle (not shown) of solenoid 100. The EGR sensor 116 is configured to provide signals indicative of the position of the spindle, and thus the valve 96, for use by the ECM 110 for diagnostic purposes, as will be understood by those skilled in the art.

Those skilled in the art will recognize that it may be desirable for the intersection of pipe 66 and the exhaust manifold 16 to be as far upstream in the exhaust manifold as possible so that the exhaust gas that mixes with secondary air has a sufficiently high temperature. For example, and within the scope of the claimed invention, a pipe or other fluid conduit may intersect the exhaust manifold runners to inject air adjacent to the exhaust ports.

Figure 5:
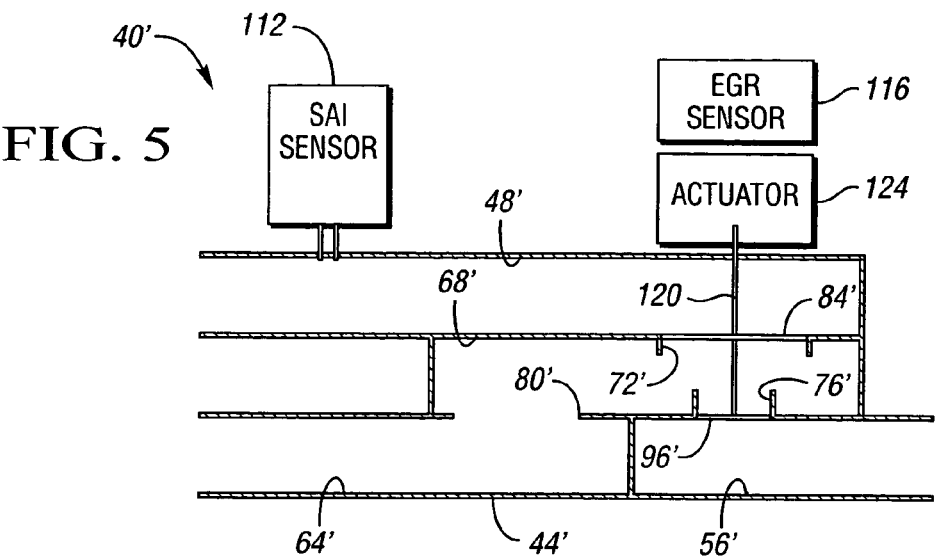
FIG. 5 is a schematic, cross-sectional side view of an alternative valve assembly configuration in which first and second valves are closed to prevent secondary air flow and EGR flow.
Figure 6:
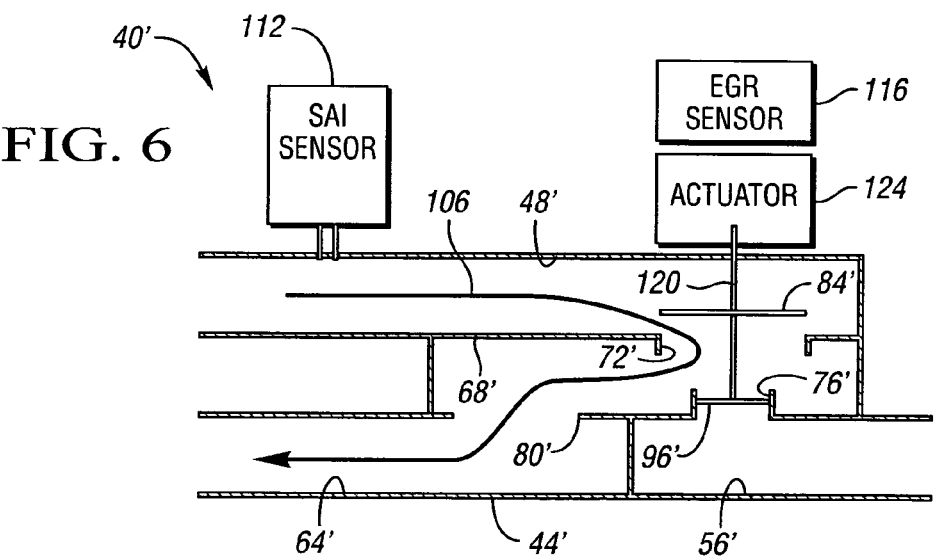
FIG. 6 is a schematic, cross-sectional side view of the valve assembly of FIG. 5 in which the first valve is open to enable secondary air flow and the second valve is closed to prevent EGR flow.
Figure 7:
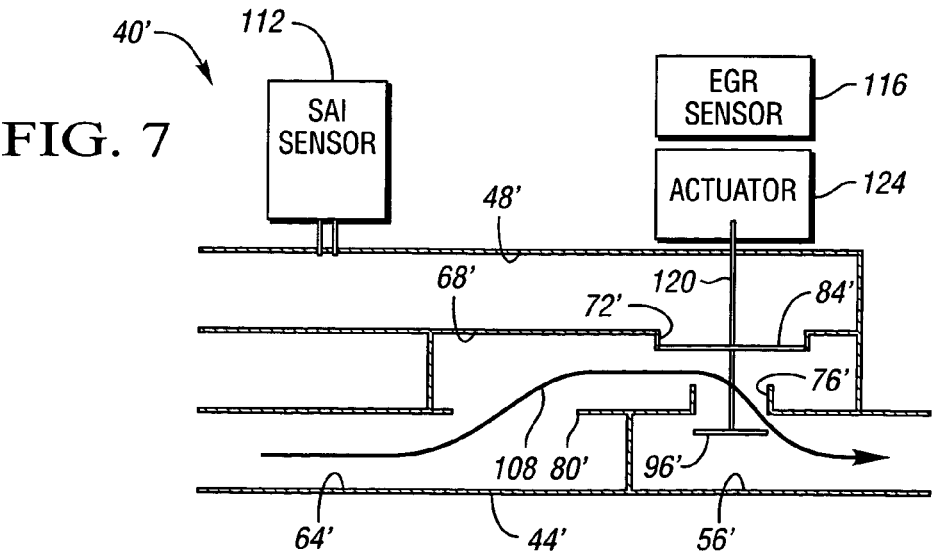
FIG. 7 is a schematic, cross-sectional side view of the valve assembly of FIG. 5 in which the first valve is closed to prevent secondary air flow and the second valve is open to enable EGR flow.

Referring to FIG. 5, wherein like reference numbers refer to like components from FIGS. 1–4, a valve assembly 40' having an alternative configuration is schematically depicted. The valve assembly 40' includes a first port 72' interconnecting the first conduit 48' and the chamber 68', a second port 76' interconnecting the second conduit 56' and the chamber 68', and a third port 80' interconnecting the third conduit 64' and the chamber 68'. An SAI valve 84' and an EGR valve 96' are rigidly interconnected for unitary movement by member 120. Member 120 is operatively connected to actuator 124. The actuator 124 is configured to selectively move the valve member 120 between three positions, namely a first position as shown in FIG. 5, a second position as shown in FIG. 6, and a third position as shown in FIG. 7. The ports 72' and 76' are sufficiently dimensioned such that valves 84' and 96' are movable to multiple closed positions.

In the first position, the SAI valve 84' obstructs the first port 72' to prevent fluid communication between the chamber 68' and the first conduit 48' and, correspondingly, between the chamber 68' and the air pump. The EGR valve 96' obstructs the second port 76' to prevent fluid communication between the chamber 68' and the second conduit 56' and, correspondingly, between the chamber 68' and the intake manifold.

Referring to FIG. 6, the second position of member 120 corresponds to a secondary air injection mode in which pressurized air 106 from the air pump is injected into the exhaust manifold. The member 120 is positioned such that the SAI valve 84' permits secondary air 106 to flow from the pump to the exhaust manifold via the first conduit 48', port 72', chamber 68', port 80', and the third conduit 64'. When the member 120 is in the second position, the EGR valve 96' obstructs the second port 76' to prevent fluid communication between the intake manifold and the chamber 68'.

Referring to FIG. 7, the third position of member 120 corresponds to an EGR mode in which exhaust gas 108 from the exhaust manifold is directed to the air intake manifold. The member 120 is positioned such that the EGR valve 96' permits exhaust gas 108 to flow from the exhaust manifold to the intake manifold via the third conduit 64', the third port 80', the chamber 68', the second port 76', and the second conduit 56'. When the member 120 is in the third position, the SAI valve 84' obstructs the first port 72' to prevent fluid communication between the air pump and the chamber 68'.

While the best modes for carrying out the invention have been described in detail, those familiar with the art to which this invention relates will recognize various alternative designs and embodiments for practicing the invention within the scope of the appended claims.

The invention claimed is:

1. A valve assembly for an engine having a secondary air pump, an exhaust manifold, and an intake manifold, the valve assembly comprising:
    a member defining a chamber having a first port, a second port, and a third port;
    a first conduit adapted to be operatively connected to the secondary air pump for fluid communication therewith;
    a second conduit adapted to be operatively connected to the intake manifold for fluid communication therewith;
    a third conduit adapted to be operatively connected to the exhaust manifold for fluid communication therewith;
    a first valve movable between a closed position in which the first valve obstructs the first port to prevent fluid communication between the first conduit and the chamber, and an open position in which the first valve permits fluid communication between the first conduit and chamber through the first port; and
    a second valve movable between a closed position in which the second valve obstructs the second port to prevent fluid communication between the second conduit and the chamber, and an open position in which the second valve permits fluid communication between the second conduit and the chamber through the second port;
    said first and second valves being interconnected for unitary movement.

2. An engine comprising:
    an air intake manifold;
    an exhaust manifold configured to convey exhaust gas;
    an air pump configured to pressurize air;
    a member defining a chamber having a first port, a second port and a third port;
    a valve member including a first valve and a second valve rigidly interconnected for unitary movement;
    wherein the valve member is selectively movable between:
        a first position in which (a) the first valve obstructs the first port to prevent fluid communication between the chamber and the air pump and (b) the second valve obstructs the second port to prevent fluid communication between the intake manifold and the chamber,
        a second position in which (a) the first valve permits fluid communication between the air pump and the chamber via the first port and (b) the second valve obstructs the second port to prevent fluid communication between the intake manifold and the chamber, and
        a third position in which (a) the first valve obstructs the first port to prevent fluid communication between the air pump and the chamber and (b) the second valve permits fluid communication between the intake manifold and the chamber via the second port; and
    wherein the third port is in fluid communication with the exhaust manifold.

3. The engine of claim 2, further comprising an actuator configured to selectively move the valve member between its first, second, and third positions.

4. An engine comprising:
    an air intake manifold;
    an exhaust manifold configured to convey exhaust gas;
    an air pump configured to pressurize air;
    a member defining a chamber having a first port, a second port and a third port;
    a first valve selectively movable between a closed position in which the first valve obstructs the first port to prevent fluid communication between the chamber and the air pump, and an open position in which the chamber is in fluid communication with the air pump through the first port; and
    a second valve selectively movable between a closed position in which the second valve obstructs the second port to prevent fluid communication between the chamber and the air intake manifold and an open position in which the chamber is in fluid communication with the air intake manifold;
    wherein the third port is in fluid communication with the exhaust manifold;
    wherein the engine is sufficiently configured for a first mode of operation and a second mode of operation; wherein, in the first mode, the first valve is open and air from the pump flows to the exhaust manifold via the first port, the chamber, and the third port; and wherein, in the second mode, the second valve is open and exhaust from the exhaust manifold flows to the intake manifold via the third port, the chamber, and the second port.

5. The engine of claim 4, wherein the first valve and the second valve are rigidly interconnected for unitary movement; and wherein the engine further comprises an actuator operatively connected to the first and second valves and configured to move the valves between their respective open and closed positions.

6. The engine of claim 4, further comprising a first actuator operatively connected to the first valve and configured to selectively move the first valve between its open and closed positions; and a second actuator operatively connected to the second valve and configured to selectively move the second valve between its open and closed positions.

7. The engine of claim 6, further comprising a controller programmed to selectively cause the first actuator to move the first valve to its open position such that the pump is in fluid communication with the exhaust manifold via the first port, the chamber, and the third port.

8. The engine of claim 7, wherein the controller is programmed to selectively cause the second actuator to move the second valve to its open position such that the exhaust manifold is in fluid communication with the intake manifold via the second port, the chamber, and the third port.

* * * * *